May 15, 1934.   R. A. HEISING   1,958,620
PIEZO-ELECTRIC CRYSTALS HAVING LOW TEMPERATURE COEFFICIENTS OF FREQUENCY
Filed April 2, 1929   2 Sheets-Sheet 1

INVENTOR
R. A. HEISING
BY Guy T. Morris
ATTORNEY

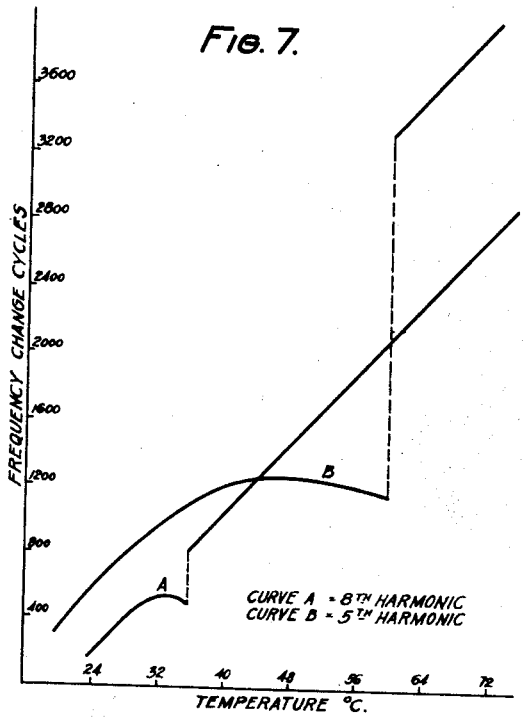
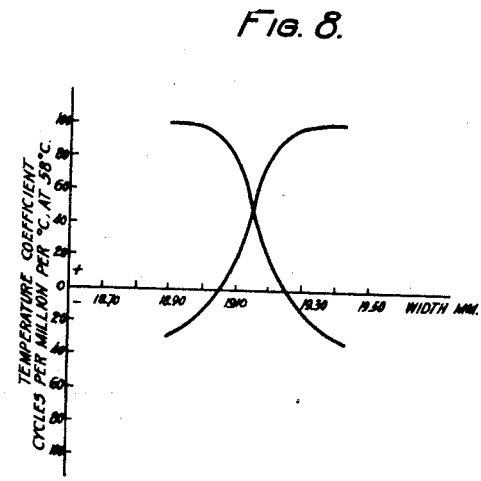
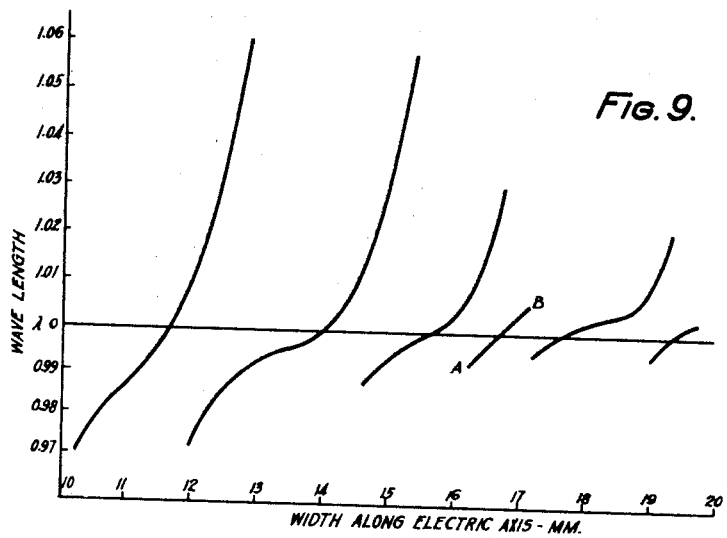

Patented May 15, 1934

1,958,620

UNITED STATES PATENT OFFICE 1,958,620

PIEZO-ELECTRIC CRYSTALS HAVING LOW TEMPERATURE COEFFICIENTS OF FREQUENCY

Raymond A. Heising, Millburn, N. J., assignor to Bell Telephone Laboratories, Incorporated, New York, N. Y., a corporation of New York Application April 2, 1929, Serial No. 351,865

6 Claims. (Cl. 171—327)

This invention relates to piezo-electric crystals and particularly to crystals having small temperature coefficients of frequency, and methods of cutting such crystals to have very small or zero temperature coefficients of frequency within a temperature range at which the crystals may be controlled conveniently.

The advantages of utilizing the piezo-electric effect of substances possessing such properties in the control of electrical oscillations of constant frequency have been known for some time. The uses for a constant frequency are constantly increasing, as well as the need of control within more rigid limits. Such uses include the control of broadcasting stations on their assigned wave lengths, control of the frequency of the local oscillations in heterodyne receivers, of sending and receiving sets in picture transmission and television, avoiding the necessity of a synchronization channel, of carrier waves in carrier telephony and telegraphy, for controlling the frequency of transmitters and receivers in short wave communication, where the carrier is suppressed, and for laboratory reference standards.

The object of this invention is to provide a piezo-electric crystal element having a zero temperature coefficient of frequency within a temperature range at which the crystal may be conveniently controlled. This temperature range at which control is desired may be roughly stated to be between 40° and 70° C.

It has heretofore been discovered that a piezo-electric element, such as quartz, cut from a natural crystal so that its electrode faces are parallel to the optic axis and an electric axis of the natural crystal will exhibit erratic temperature coefficients and, in some instances, will have a low temperature coefficient of frequency over a portion of the temperature range. By means of this invention this point of low temperature coefficient may be readily controlled.

The axes of the quartz crystal are referred to as the optical, electrical and mechanical axes in this specification. It should be noted that the axis designated herein as the mechanical axis is sometimes designated the crystallographic axis.

A crystal plate constitutes an extremely complex vibration system with a large number of fundamental modes of vibration, such as longitudinal, flexural, torsional, and shear vibrations in each of the three dimensions. The resonant frequencies observed are for the most part various combinations of these fundamental types of vibration. The temperature coefficient of frequency of a crystal depends upon the temperature coefficient of the various mechanical elastic constants that are called into play by the crystal vibration.

In general, a quartz crystal plate cut with any orientation with respect to the crystal axes will respond to a large number of frequencies. When it is cut so that its major surfaces are parallel to the optic axis and an electric axis, there are two major response frequencies, one high and the other low. For thin plates of relatively large area the high frequency is a function of the thickness of the plate and is given by the approximate expression:

$$f = \frac{K}{t}$$

where $t$ is the thickness of the plate in millimeters and $K$ is equal to $1.96 \times 10^6$. The low frequency is a function of the width, the dimension parallel to the electric axis, and is given by the expression $$f = \frac{K}{t},$$

where $t$ is the width in millimeters and $K$ is equal to $2.860 \times 10^6$.

It will be noted that the constant for the width vibration differs from that found for the thickness vibration. Moreover, the temperature coefficient of the width vibration is negative, while the temperature coefficient of the thickness vibrations is positive. This indicates that the vibrations are of different types, and it is probable that the width vibrations are longitudinal, while the thickness vibrations are shear.

For the parallel cut plates, then, there are two possible major modes of vibration which, however, differ in type of vibration and sign of temperature coefficient. The frequency thickness constant of the general run of crystals previously used varies considerably with the width for any but thin plates. The temperature coefficient also varies with the width and is in addition a function of the temperature. This coefficient has a wide range of values, whose upper limit is approximately plus 100 cycles in a million per degree centigrade, and whose lower limit is minus 20 cycles in a million per degree centigrade in some special instances, with all intermediate values including zero. The two high frequency modes of vibration previously referred to usually have widely different characteristics, and a crystal controlled oscillator will usually start on either of these modes if the circuit constants are changed slightly.

The various phenomena exhibited by parallel cut crystals are illustrated in the attached drawings in which:

Fig. 1 shows a section of a natural crystal of some piezo-electrical material, preferably of quartz, having its ends cut off in planes perpendicular to the optic axis thereof, with a section 1 from which an oscillator has been cut so that its major surfaces are in planes parallel to the optic axis and an electric axis, and another section 2 which may also be cut out from the crystal with the same orientation;

Fig. 7 shows the frequency change of a parallel cut crystal whose natural thickness vibrations are near the 5th and 8th harmonics of its width vibrations, respectively, with changes in temperature;

Fig. 8 shows the change in the temperature coefficients of the two high frequency vibrations of a parallel cut crystal as its width is decreased through a point where its thickness vibrations are in harmonic relationship to its width vibrations;

Fig. 9 shows the change in the wave length of the response waves of a parallel cut crystal with varying width and constant thickness.

Figure 1:
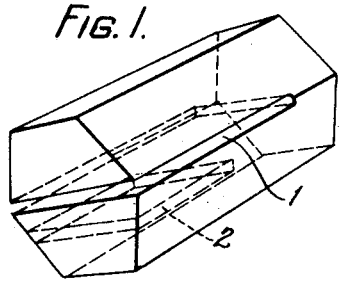
Figure 2:
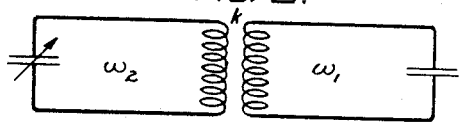
Fig. 2 shows two coupled electrical circuits which will be used to explain the invention, having uncoupled angular frequencies $\omega_1$ and $\omega_2$.
Figure 3:
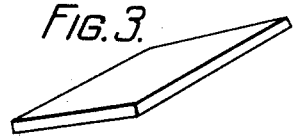
Fig. 3 shows a piezo-electric plate after it has been removed from the natural crystal from which it has been cut, as, for example, from section 1 of Fig. 1, and is ready for use. The opposite edges and faces of the plate are parallel.

Consider the two coupled electrical oscillatory circuits shown in Fig. 2 having uncoupled angular frequencies $\omega_1$ and $\omega_2$. Then the coupled frequencies in the absence of damping will be given by the expression:

$$\omega = \frac{\sqrt{\frac{1}{2}(\omega_1^2+\omega_2^2) \pm \frac{1}{2}\sqrt{(\omega_1^2-\omega_2^2)^2 + 4k^2\omega_1^2\omega_2^2}}}{\sqrt{1-k^2}} \quad (I)$$

$k$ being the coupling.

Figure 6:
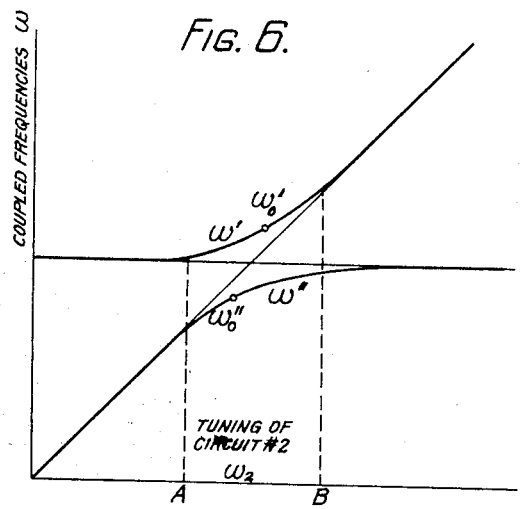
Fig. 6 shows the coupled or resulting response frequencies of two coupled circuits as their uncoupled frequencies pass through a point where they are in tuned relationship.

If these two coupled frequencies be plotted as a function of the tuning of the second circuit, that is, $\omega_2$, the set of curves in Fig. 6 results. That is, as the two circuits approach and pass through the point at which their uncoupled frequencies are equal, the reaction of each circuit on the other increases, so that two frequencies are obtained, as represented by curves $\omega'$ and $\omega''$.

Figure 4:
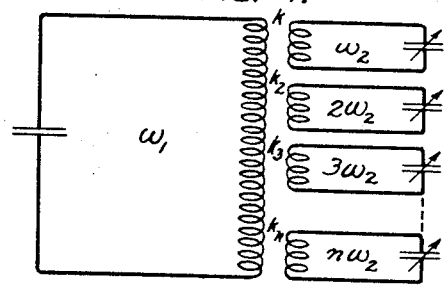
Fig. 4 shows a plurality of coupled circuits having the uncoupled angular frequencies $\omega_1$ and $\omega_2$ and harmonics of $\omega_2$.

Suppose now other circuits are added to the system as shown in Fig. 4, each additional circuit being fixed at a harmonic of the uncoupled frequency of the circuit of $\omega_2$ and tuned simultaneously to maintain this harmonic relationship. Then as $\omega_2$ and its related frequencies $2\omega_2$, $3\omega_2$ - - - $n\omega_2$ are simultaneously varied, each individual circuit will successively be tuned to the frequency $\omega_1$ and a series of coupling points passed through, such as the one shown in Fig. 6. For further discussion of coupled circuit theory, reference may be made to any standard work on oscillations, for example, Morecroft: "Principles of Radio Communication", where coupled circuits are discussed and the relation between coefficient of coupling and periods of tuned circuits and of the resulting free periods is given.

It has been experimentally determined that a crystal plate will behave just as the tuned circuits just discussed. Thus, Fig. 9 shows a curve of the wave lengths at which a parallel cut plate will oscillate, plotted as a function of the width (the dimension along the electric axis), the thickness and length remaining constant. It will be seen that as the width of the crystal plate is decreased (moving to the left toward the origin), the wave length of the thickness vibration instead of remaining constant at $\lambda_0$, is constantly shifting and that for most widths the crystal will oscillate at two wave lengths, one longer and the other shorter than $\lambda_0$. These curves are found to cross the $\lambda_0$ line between points at which the thickness vibration is a harmonic of the fundamental width vibration as would be expected from the theory. In this experimental curve, there occurs an anomalous curve AB. Its cause is not known at this time, but is thought to be due to the coupling of some third period, possibly a high order harmonic of a flexural or torsional, or longitudinal vibration of the length. If these parallel cut crystal plates are considered as a system of coupled circuits, the variation of the frequency thickness constant with dimensional ratios, and the presence of the frequency doublets, is seen to be due to the coupling between the thickness vibrations and the width vibrations. With an experimentally determined coupling curve the coefficient of coupling between the two modes of vibration at the $n$th harmonic may be determined from the expression:

$$k_n = \frac{\left(\frac{\omega'}{\omega''}\right)^2 - 1}{\left(\frac{\omega'}{\omega''}\right)^2 + 1} \quad (II)$$

where $\omega'$ and $\omega''$ are the coupled angular frequencies at the point where $\omega_1 = n\omega_2$.

As mentioned above, the temperature coefficient of parallel cut crystal plates varies among plates having the same thickness, but slightly different areas or widths, and the temperature coefficient of a given plate is a function of the temperature. To illustrate this point two frequency temperature curves for a parallel cut crystal are shown in Fig. 7. It will be noted that the frequency increase is linear until a given temperature is reached, at which time the curve flattens off and then begins to reverse. Just beyond the point of reversal the frequency jumps to a new value and if the curve is continued, the frequency increases again at the same rate as originally. This type of temperature coefficient is common to a large percentage of parallel cut crystals, such crystals differing from each other in the widths of the flat parts of their curves and the temperatures at which the discontinuities occur. These points at which the curve flattens out and jumps occur at points at which the vibrations of the crystals in different modes are in harmonic relationship. If the coupled circuit analysis is again applied and the proper temperature coefficients, with due regard to relative magnitude and sign, are identified with each circuit, the change in temperature coefficient with dimensional ratio and temperature can be explained. In addition, the dimensional ratios or tuning points which will yield zero temperature coefficients for a given temperature may be predicted if the coupling is known.

Referring again to Fig. 6, suppose the two electrical circuits have temperature coefficients of opposite sign, $\omega_1$ being positive and $\omega_2$ negative. For $\omega_2$ less than $\omega_1$ say at the point A, $\omega'$ has a positive and $\omega''$ a negative temperature coefficient. For a value of $\omega_2$ greater than $\omega_1$, say at B, $\omega'$ now has a negative and $\omega''$ a positive temperature coefficient, $\omega'$ and $\omega''$ having interchanged rôles. Somewhere between therefore, $\omega'$ and $\omega''$ must have had zero temperature coefficients. Returning to Equation (I) and noting as above that $\omega_1$ and $\omega_2$ are functions of temperature, if this expression for $\omega$ be differentiated with respect to the temperature, regarding $k$, the coupling, as constant, and the result placed equal to zero, the condition that $\omega$ is independent of temperature is obtained as follows:

$$\omega^2 = \frac{\omega_1^2 \omega_2^2 (m-n)}{(m\omega_1^2 - n\omega_2^2)} \quad \text{(III)}$$

where $$m = \frac{1}{\omega_1}\frac{d\omega_1}{dT} =$$

temperature coefficient of circuit of $\omega_1$ and $$n = -\frac{1}{\omega_2}\frac{d\omega_2}{dT} =$$

temperature coefficent of circuit of $\omega_2$. Converting to ratios $$\omega^2 = \omega_2^2 \frac{1-Q}{1-Q\beta^2} \quad \text{(IV)}$$

where $$Q = \frac{n}{m} \text{ and } \beta = \frac{\omega_2}{\omega_1}.$$

Solving Equation (IV) for $\beta$ and replacing $\omega^2$ by its value from Equation (I), $$\beta^2 = \frac{k^2(1-Q)^2}{2Q} + 1 \pm \sqrt{\left[\frac{k^2(1-Q)^2}{2Q}\right]^2 + \frac{k^2(1-Q)^2}{Q}} \quad \text{(V)}$$

which when $k$ is very small becomes:

$$\beta^2 = 1 \pm \frac{k(1-Q)}{\sqrt{Q}} \quad \text{(VI)}$$

This equation gives the tuning points, or the ratios of $\omega_1$ and $\omega_2$, at which the coupled angular frequencies $\omega'$ and $\omega''$ will have zero temperature coefficients in terms of the ratios of uncoupled temperature coefficients and the coupling.

Referring again to Fig. 6, $\omega_0'$ and $\omega_0''$ represent the values of $\omega'$ and $\omega''$, which would have zero temperature coefficients provided $m$ is greater than $n$, that is, the temperature coefficient of $\omega_1$ is greater in magnitude than the temperature coefficient of $\omega_2$.

If the variation of the temperature coefficient of a crystal plate be examined at a given temperature as the width is changed (which amounts to a change in the tuning of the transverse vibration), the experimental results are in accord with the above treatment. Fig. 8 shows two temperature coefficients of a crystal plate at 58° C. as its width is progressively reduced in the neighborhood of the fifth harmonic of the transverse vibration. These curves show how the temperature coefficients change sign in this region.

The experimentally determined curve of frequency versus temperature for a parallel cut crystal plate shown in Fig. 7 can also be explained with the aid of the above analysis by considering a change in temperature as equivalent to a change in tuning of both uncoupled frequencies, that is, an increase in temperature produces the same result as would be obtained at constant temperature by decreasing the thickness of the crystal plate and increasing its width, or an increase in frequency of $\omega_1$ and a decrease in the frequency of $\omega_2$ in the region where they pass through the condition of equality of frequency. If the crystal represented by curve B is oscillating at 32°, the particular coupled frequency in this region has a positive temperature coefficient. As the temperature increases the frequency increases, passing through a maximum at about 45° where it has a zero coefficient, and then decreases. As the frequency decreases the activity of the transverse vibrations decreases rapidly and finally the crystal hops frequency at about 60°. From this point on the frequency increases, for this coupled period has a positive temperature coefficient in this region. If it were not for the decrease in activity of the period with the negative temperature coefficient it would be expected that the crystal frequency, instead of hopping, would continue to decrease with increase in temperature. A frequency jump usually occurs however, just after the zero temperature coefficient region is passed. This is to be expected, for the coupled frequency with the negative coefficient, depending as it does upon a harmonic of the vibration transverse to the applied field, would naturally be more difficult to excite than the fundamental in the other direction.

Fig. 9 shows that as the order of the harmonic is reduced, the coupling between the harmonic of the width and the fundamental of the thickness is increased. This can be readily estimated from the separation of the coupled periods at the coincident tuning points. As the coupling increases, the temperature range for which there is no frequency change with temperature increases, that is, the region of zero temperature coefficient becomes extended. To illustrate this, two curves of frequency versus temperature have been shown in Fig. 7, one for the coupling of a fifth harmonic, the other for an eighth, the magnitude of the coupling for the fifth being much greater.

It is of course desirable to extend the zero temperature coefficient range over the limits of the temperature to be expected in normal operation. This necessitates tight coupling of the two modes of vibration, which in turn demands a dimensional ratio in the neighborhood of unity. The cross-sectional area of such a plate in the direction of its thickness and width approaches a square in shape, which for high frequency crystals is of very small dimensions.

The temperature at which a crystal plate with any given harmonic relationship between its thickness and width vibrations has a zero temperature coefficient may be accurately controlled, however, within the limits of temperature at which the temperature may be most conveniently controlled by auxiliary apparatus. This may be accomplished by grinding the crystal to the proper dimensional ratio for any given harmonic relationship. That is, if it is desired to make a zero temperature coefficient crystal at the fifth harmonic, the crystal plate may be ground to dimensions at which the zero temperature coefficient will be obtained at say 50° C.

To make a low coefficient crystal by this method it is first necessary to ascertain the coefficient of coupling between the thickness vibration and the harmonic of the width vibration which it is desired to use. This is done by grinding a sample crystal of the orientation and approximate dimensional ratio to be used so as to plot the two response frequencies as the two coupled vibrations pass through resonance with each other. The difference in the resulting frequencies enables one to compute $k$ from Equation II herein. For a given orientation of the crystal in cutting and a given ratio of dimension, the coupling may be expected to remain constant and once ascertained may be used repeatedly thereafter. It is desirable to compute this coupling $k$ for groups of like crystals, inasmuch as a slight change of orientation of the plate with respect to a face or the optic axis of the mother crystal will change the coupling somewhat. The coupling also varies with the particular harmonic of the width to be used. It also changes somewhat with the length if the length is not long compared to the width and thickness. Of course for a particular crystal the coupling may be determined, for the particular dimensional ratio to be used, at a lower frequency than that at which the crystal is designed to oscillate, inasmuch as the coupling is constant irrespective of frequency changes for any harmonic, provided the orientation is fixed.

As an example, one quartz crystal using the fifth harmonic, whose length was 47 millimeters, width 19.3 millimeters, and thickness 2.76 millimeters, and the orientation of the plate within 30 minutes of a natural face and the optic axis, had a coupling coefficient $k$ of 0.01.

It is also necessary to know the temperature coefficients of the two modes of vibration, or at least their ratio. This ratio for quartz has been found from a considerable number of measurements to be approximately .25 ($=Q$, that is, the numerical value of the negative coefficient divided by the numerical value of the positive coefficient, or $\frac{n}{m}$), and this figure has been found satisfactory for use in cutting such crystals. This figure is the same for all quartz if flawless and otherwise suitable for the cutting of crystal plates.

When the coefficient of coupling $k$ has been ascertained, by using Equation V above or its approximate form Equation VI, the ratio of the two crystal free periods which may be coupled together to produce a zero temperature coefficient may be computed.

The value of $$\beta = \frac{\omega_2}{\omega_1}$$

is then put into Equation IV to ascertain the relation between one of the response frequencies and one of the coupled frequencies.

It is also necessary of course to know the frequency constants of the two modes of vibration. This has been given above to be $1.96 \times 10^6$ for the thickness vibration and $2.860 \times 10^6$ for the width vibration.

Equation IV may also be written in terms of wave length as follows:

$$\lambda^2 = \lambda_2^2 \frac{1-Q\beta^2}{1-Q} \qquad \text{(VII)}$$

If the wave lengths are used the frequency constants must be converted into wave length constants. The wave length constant for the thickness is 153, that is, if the period is not influenced by other modes of vibration, the radio wave length expressed in meters will be 153 multiplied by its thickness in millimeters. The constant for the width (along the electric axis) is 104.6. The width of the crystal, multiplied by 104.6, and divided by the order of the harmonic being used, determines the radio wave length of the negative coefficient mode which is influencing the operation of the crystal and producing the major effect upon the temperature coefficient.

Figure 5:
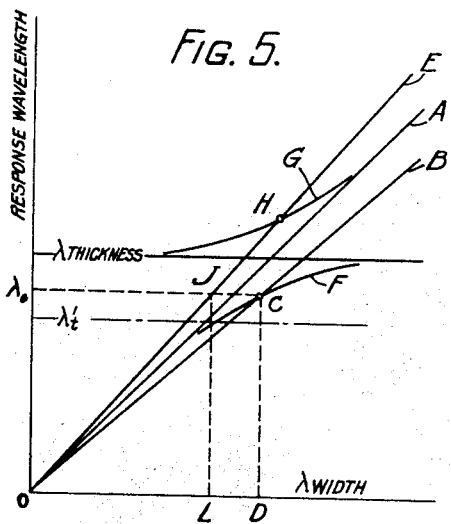
Fig. 5 shows the relation between the zero coefficient points and the uncoupled natural wave lengths for a parallel cut crystal.

The method of ascertaining the dimensions of the crystal to be used, that is, width and thickness is then as follows:

In Fig. 5 the inclined line OA represents the response frequency due to the harmonic of the width as the width is changed. For simplicity only the actual harmonic is plotted and this is called $\lambda$-width. In cutting a crystal it is usually desirable to try and secure operation at the higher of the two frequencies which will give zero coefficient because if the crystal is accidentally ground too much, it may then be ground further to secure the zero coefficient at the other point. (This sketch, as well as other figures in the drawings, is plotted in terms of wave length rather than in frequency because the wave lengths are proportional to the dimensions of the crystal). Grinding the crystal is therefore a continuous process of moving to the left and downward on this diagram. If it is desired to get an operating frequency represented by $\lambda_0$ in this figure, the line OB should first be drawn according to the following equation (which is an approximate form of VII when $k$ is small)

$$\lambda' = (\lambda \text{ width}) \sqrt{1-k\sqrt{Q}} \qquad \text{(VIII)}$$

which is the locus of the higher zero coefficient frequency as the dimensions are changed. Projecting across from $\lambda_0$ and intersecting line OB at C, and then projecting downward to the point marked D, the wave length for which the width should be ground is obtained. Then by using equation $$\lambda^2 \text{ (thickness)} = \lambda^2 \text{ (width)} \left(1 + k\frac{(1-Q)}{\sqrt{Q}}\right) \qquad \text{(IX)}$$

(an approximate form of V) the wave length for which the thickness is to be ground may be computed. This gives the dimensions which will give zero temperature coefficient at wave length $\lambda_0$ if the measurements of coupling are correct and the crystal is flawless.

The following are the actual dimensions in millimeters of some crystals which have a zero temperature coefficient:

| MX | EX | OX | Frequency (KC) |
|---|---|---|---|
| 3.90 | 33.8 | 44.5 | 500 |
| 3.90 | 40.0 | 44.5 | 500 |
| 2.16 | 25.1 | 25.0 | 900 |
| 1.952 | 17.12 | 22.3 | 1000 |
| 1.957 | 17.22 | 22.3 | 1000 |

MX is the dimension along the mechanical axis,
EX is the dimension along the electrical axis,
OX is the dimension along the optical axis.

The connection between this process and the previous explanation may be seen by considering the response curves F and G. These are the curves giving the response frequencies if a crystal of the thickness just determined is ground on its width from a larger value than D just ascertained and carried past the point L. The point at which the grinding would stop for operating at zero coefficient point C would be at width D. Before reaching that point, however, a point H would have been passed which would have produced zero coefficient at a lower frequency or longer wave length. If the crystal were ground too far and the point C passed, it can now be ground down so that the lesser width at line OE will give the desired wave length $\lambda_0$. OE is the locus of the zero coefficient points of the lower frequency for this particular coupling, whose equation is $$\lambda'' = \lambda \text{ (width)} \sqrt{1 + k\sqrt{Q}} \quad \text{(X)}$$

The intersection of the projection from $\lambda_0$ with this line at J gives the width L to which the crystal should be ground. Using formula $$\lambda^2 \text{ (thickness)} = \lambda^2 \text{ (width)} \left(1 - k \frac{(1-Q)}{\sqrt{Q}}\right) \text{(XI)}$$

a new thickness $\lambda t'$ is now obtained for grinding the thickness to obtain a zero coefficient crystal, but this time operating at the lower frequency of the two coupled circuits.

In grinding a crystal it is desirable to make the dimensions slightly larger than those computed from these formulæ and then grind the crystals slowly to the desired dimensions, measuring the frequency and temperature coefficient periodically. This is because in the present state of the art of mechanical measurement, it is not always possible to measure the dimensions of a crystal to the accuracy to which the frequency must be known.

If it is desired to operate at the higher frequency (lower wave length corresponding to point C) grinding the crystal narrower moves the temperature coefficient from plus towards minus and raises the frequency slowly. Grinding the crystal thinner moves the coefficient from minus towards plus and raises the frequency rapidly.

If it is desired to operate on the lower response frequency (longer wave length corresponding to point H or J in the previous discussion), grinding the crystal narrower moves the coefficient from minus towards plus and raises the frequency slowly. Grinding the crystal thinner moves the coefficient from plus towards minus and raises the frequency rapidly.

In all cases grinding down the width raises the temperature at which zero coefficient occurs, and grinding down the thickness lowers the temperature at which zero coefficient occurs. It is thus possible by taking frequency measurements at the same temperature throughout the grinding process to produce a crystal plate which will have a zero temperature coefficient at the desired frequency and temperature.

In making low coefficient crystals using low order harmonics of the width vibration, the coupling becomes so tight that the approximate formulæ cannot be used but complete formulæ must be used. In these cases, wider latitude in dimensions may be allowed and more dependence placed on grinding and measurement.

When the lower order harmonics of the width vibration are used, the tighter coupling causes the resulting response frequencies $\omega'$ and $\omega''$ to be more widely separated and enables the tuned circuit in the plate of a crystal oscillator to discriminate at which frequency it is desired to operate. Any well known type of oscillator circuit may be used.

What is claimed is:

1. A parallel-cut quartz crystal plate, cut from a mother crystal, said plate having substantially zero temperature coefficient of frequency at normal operating temperature, characterized in this that its dimension parallel to the optical axis of said mother crystal is approximately 22.30 millimeters, its dimension parallel to an electrical axis of said mother crystal is approximately 17.22 millimeters and its dimension parallel to a mechanical axis of said mother crystal is approximately 1.957 millimeters, said crystal plate having a response frequency of approximately 1,000 kilocycles per second.

2. A high frequency quartz crystal resonator plate, the principal plane of which is parallel to the optical and one of the electrical axes of the quartz crystal, having a harmonic frequency of one mode of vibration approximately equal to the fundamental frequency of another mode of vibration, said harmonic frequency being determined by the length of the resonator along the electrical axis of the crystal and said fundamental frequency being determined by the thickness of the resonator along the mechanical axis, and having said harmonic frequency so related to said fundamental frequency that the resonant frequency of said resonator is substantially independent of temperature.

3. A method of producing a substantially zero temperature coefficient of frequency quartz crystal resonator, which comprises preparing a slab of quartz, the principal plane of which is parallel to the optical and one of the electrical axes of the quartz crystal, determining the frequency constants and the temperature coefficients of frequency of two modes of vibration and determining the coefficient of coupling between these modes of vibration from a sample piece of said slab of quartz, preparing a resonator plate from said slab of quartz which is slightly larger than that required for the specified frequency, and adjusting the frequencies of these two modes of vibration so that the temperature coefficient of frequency of said resonator will be substantially zero at the specified temperature and frequency.

4. A method of producing a piezoelectric resonator which has substantially a zero temperature coefficient of frequency from a slab of quartz crystal, the principal plane of which is parallel to the optical and one of the electrical axes of the quartz crystal, which comprises cutting a resonator plate from said slab which is slightly larger than that required for the specified frequency, and adjusting the coupled frequencies in the different modes of vibration by reducing one or more dimensions of the plate so that the higher frequency of the coupled frequencies will have a substantially zero temperature coefficient of frequency at the specified frequency and temperature.

5. A method of securing a piezoelectric resonator which has a substantially zero temperature coefficient of frequency from a resonator produced in accordance with claim 4 which has inadvertently become slightly too small, which comprises again adjusting the coupled frequencies in the different modes of vibration so that the lower frequency of the coupled frequencies will have a substantially zero temperature coefficient of frequency at the specified frequency and temperature.

6. In the preparation of piezoelectric resonators, the method of adjusting the frequency of the high frequency resonance which is a function of the thickness of said resonator, said method comprises constructing a resonator of slightly greater dimensions than that required from a slab of quartz crystal, the principal plane of which is parallel to the optical and one of the electrical axes of the crystal and which is of greater thickness than required for the specified frequency; reducing the thickness of the resonator to the approximate thickness required for the resonator to resonate at the specified frequency; and then adjusting the resonance frequency of the resonator ot the specified frequency by reducing the length of the resonator along the electrical axis.

RAYMOND A. HEISING.